(12) United States Patent
Ida et al.

(10) Patent No.: US 10,840,567 B2
(45) Date of Patent: Nov. 17, 2020

(54) STORAGE BATTERY COOLING CONTROL DEVICE AND STORAGE BATTERY COOLING CONTROL METHOD

(71) Applicant: MITSUBISHI ELECTRIC CORPORATION, Chiyoda-ku (JP)

(72) Inventors: Takahito Ida, Chiyoda-ku (JP); Keisuke Ogasawara, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 199 days.

(21) Appl. No.: 16/304,871

(22) PCT Filed: Mar. 16, 2017

(86) PCT No.: PCT/JP2017/010756
§ 371 (c)(1),
(2) Date: Nov. 27, 2018

(87) PCT Pub. No.: WO2018/003203
PCT Pub. Date: Jan. 4, 2018

(65) Prior Publication Data
US 2019/0237826 A1     Aug. 1, 2019

(30) Foreign Application Priority Data
Jul. 1, 2016 (JP) .................. 2016-131375

(51) Int. Cl.
*H01M 10/613* (2014.01)
*H02J 3/32* (2006.01)
(Continued)

(52) U.S. Cl.
CPC ......... *H01M 10/613* (2015.04); *H01M 10/44* (2013.01); *H01M 10/443* (2013.01);
(Continued)

(58) Field of Classification Search
CPC ........ H02J 7/0029; H02J 7/0026; H02J 7/027; H02J 7/1461; H02J 7/166; H02J 7/00302;
(Continued)

(56) References Cited

U.S. PATENT DOCUMENTS

| | | | | |
|---|---|---|---|---|
| 2015/0128632 | A1* | 5/2015 | Kishita | F25B 25/005 62/324.6 |
| 2015/0331059 | A1* | 11/2015 | Okada | G01R 31/374 320/134 |
| 2017/0149256 | A1* | 5/2017 | Srinivasan | H01M 10/44 |

FOREIGN PATENT DOCUMENTS

| | | |
|---|---|---|
| JP | 2005-63682 A | 3/2005 |
| JP | 2006-32169 A | 2/2006 |

(Continued)

OTHER PUBLICATIONS

International Search Report dated Apr. 25, 2017 in PCT/JP2017/010756 filed on Mar. 16, 2017.

*Primary Examiner* — Drew A Dunn
*Assistant Examiner* — Sailesh Thapa
(74) *Attorney, Agent, or Firm* — Xsensus LLP

(57) ABSTRACT

A storage battery cooling control device includes a system power calculator (18) configured to calculate power of an external power source as power information, and a charge/discharge control unit (20) configured to perform charge/discharge control of a storage battery based on the power information, and to perform power control of a cooling device by distributing power to the cooling device within a cooling power threshold, which is determined so that a heat generation increment of the storage battery is equal to or less than a heat exhaust increment of the cooling device calculated from a cooling air flow rate.

6 Claims, 7 Drawing Sheets

(51) Int. Cl.
*H01M 10/633* (2014.01)
*H01M 10/6563* (2014.01)
*H01M 10/6557* (2014.01)
*H01M 10/627* (2014.01)
*H02J 7/00* (2006.01)
*H01M 10/44* (2006.01)
*H01M 10/48* (2006.01)
*H02J 3/38* (2006.01)

(52) U.S. Cl.
CPC ......... *H01M 10/48* (2013.01); *H01M 10/486* (2013.01); *H01M 10/627* (2015.04); *H01M 10/633* (2015.04); *H01M 10/6557* (2015.04); *H01M 10/6563* (2015.04); *H02J 3/32* (2013.01); *H02J 7/00* (2013.01); *H02J 7/0029* (2013.01); *H02J 7/0047* (2013.01); *H02J 7/0068* (2013.01); *H01M 2220/10* (2013.01); *H02J 3/383* (2013.01); *H02J 3/386* (2013.01); *H02J 7/0048* (2020.01)

(58) Field of Classification Search
CPC ............... H02J 7/00304; H02J 7/00306; H02J 7/00308; H02J 7/00309; H02J 7/0091; H02J 7/007192; H02J 7/007194; H02J 2310/62; H01M 10/613; H01M 10/615; H01M 10/44; H01M 10/48; H01M 10/443; H01M 10/486; H01M 10/6563; H01M 10/60; H01M 10/66; H01M 10/65
See application file for complete search history.

(56) References Cited

FOREIGN PATENT DOCUMENTS

JP 2013-99081 A 5/2013
JP 2015-208061 A 11/2015

\* cited by examiner

STORAGE BATTERY COOLING CONTROL DEVICE AND STORAGE BATTERY COOLING CONTROL METHOD

TECHNICAL FIELD

The present invention relates to a storage battery cooling control device and a storage battery cooling control method in which cooling control is applied to a storage battery system configured to charge from and discharge to a power system.

BACKGROUND ART

A large-scale introduction of power generation devices using natural energy, for example, solar power generation devices and wind power generation devices, to a power system is expected. Solar power generation devices and wind power generation devices, however, are unstable power sources. It is therefore becoming common to connect a storage battery to the power system in order to suppress power fluctuation.

The storage battery generates heat while charging/discharging, and a rise in storage battery temperature markedly cuts short the life span of the storage battery. The related art in which a cooling fan for cooling the storage battery is included and the related art in which a charge current and a discharge current are limited exist for that reason (see Patent Literature 1 and Patent Literature 2, for example).

Patent Literature 1 is the related art in which a cooling fan is included. In Patent Literature 1, when the measured storage battery temperature is higher than a first given temperature, the fan duty of the cooling fan is changed in relation to the temperature. The fan duty of the cooling fan in Patent Literature 1 is also changed in relation to the value of a charge current to the storage battery when the storage battery temperature is equal to or lower than the first given temperature and higher than a second given temperature. The storage battery temperature is kept within a given temperature range in Patent Literature 1 by performing control in this manner.

Patent Literature 2 is the related art in which a charge current and a discharge current are limited. The overall state of charge (SOC) of the storage battery is divided into a plurality of segments in Patent Literature 2. An upper limit current value is set for each SOC segment created by the division, to thereby make the current value small near the end of energization and consequently suppress heat generation in Patent Literature 2.

In Patent Literature 2, in the beginning of energization, the current value is set large to cause the storage battery to generate heat and prevent a drop in performance due to low temperature. Patent Literature 2 also involves lowering the upper limit current value further when the storage battery temperature is equal to or higher than an upper limit temperature value, and lowering the upper limit current value further when the amount of temperature rise of the storage battery is equal to or higher than an upper limit temperature rise value.

CITATION LIST

Patent Literatures

[PTL 1] JP 2005-63682 A
[PTL 2] JP 2015-208061 A

SUMMARY OF INVENTION

Technical Problem

The related art, however, has the following problems:

In Patent Literature 1, the fan duty of the cooling fan is changed when the storage battery temperature is higher than the first given temperature. In other words, the fan duty of the cooling fan is changed based only on the storage battery temperature in Patent Literature 1. This means that the storage battery discharges a certain amount of power to the cooling device even while discharging a large amount of current to an external power source.

The discharge from the storage battery to the cooling device while the storage battery is discharging a large amount of current to the external power source further increases the amount of heat generated due to Joule heat, resulting in the problem of a decrease in cooling efficiency by the cooling fan, or the problem of a rise in storage battery temperature. This also causes a problem in that the increased discharge current value leads to storage battery deterioration due to heavy load.

In Patent Literature 2, heat generation by the storage battery is addressed by setting an upper limit to the charge/discharge current value. Because of the upper limit charge/discharge current value, however, the ability to stabilize system power is limited in Patent Literature 2, and has problems near the end of energization.

The present invention has been made to solve the problems described above, and an object of the present invention is therefore to provide a storage battery cooling control device and a storage battery cooling control method in which the ability to stabilize system power is kept high while preventing high temperature and heavy load from cutting short the life span of a storage battery by efficiently cooling the storage battery with a cooling device.

Solution to Problem

According to one embodiment of the present invention, there is provided a storage battery cooling control device to be applied to a storage battery system, which includes a storage battery interconnected to an external power source to charge/discharge and
a cooling device configured to cool the storage battery, and is configured to execute cooling control of the storage battery by controlling the cooling device in a manner suited to a charge/discharge state, the storage battery cooling control device including: a system power calculator configured to calculate, as power information, power of the external power source from a voltage and current of the external power source; a cooling air flow rate identification unit configured to identify a cooling air flow rate from power input to the cooling device; a cooling air inlet temperature measurement unit configured to detect a temperature at a cooling air inlet of a housing in which the storage battery is placed; a cooling air outlet temperature measurement unit configured to detect a temperature at a cooling air outlet of the housing; and a charge/discharge control unit configured to perform charge/discharge control of the storage battery based on the power information, which is calculated by the system power calculator, and to perform power control of the cooling device by distributing power to the cooling device within a cooling power threshold, which is determined from a heat generation amount of the storage battery and from a heat exhaust amount of heat exhausted by the cooling device, wherein the charge/discharge control unit is configured to: calculate the heat generation amount of the storage battery from the power input to the cooling device and from the power of the external power source calculated by the system power calculator, calculate the heat exhaust amount of heat exhausted by the cooling device from the cooling air flow rate identified by the cooling air flow rate identification unit, from the temperature detected at the cooling air inlet by the cooling air inlet temperature measurement unit, and from the temperature detected at the cooling air outlet by the cooling air outlet temperature measurement unit, and determine the cooling power threshold so that a heat generation increment is equal to or less than a heat exhaust increment; and perform the charge/discharge control based on the power information by charging excess power of the external power source and discharging an amount of power that is in shortage in the external power source, and perform the power control by distributing power to the cooling device within a range equal to or less than the cooling power threshold.

According to one embodiment of the present invention, there is provided a storage battery cooling control method to be executed in the storage battery cooling control device of the one embodiment of the present invention by the charge/discharge control unit, the storage battery cooling control method including: a first step of calculating the heat generation amount of the storage battery from the power input to the cooling device and from the power of the external power source calculated by the system power calculator; a second step of calculating the heat exhaust amount of heat exhausted by the cooling device from the cooling air flow rate identified by the cooling air flow rate identification unit, from the temperature detected at the cooling air inlet by the cooling air inlet temperature measurement unit, and from the temperature detected at the cooling air outlet by the cooling air outlet temperature measurement unit; a third step of determining the cooling power threshold so that a heat generation increment is equal to or less than a heat exhaust increment; a fourth step of performing the charge/discharge control based on the power information, by charging excess power of the external power source and discharging an amount of power that is in shortage in the external power source; and a fifth step of performing the power control by distributing power to the cooling device within a range equal to or less than the cooling power threshold.

Advantageous Effects of Invention

According to the embodiments of the present invention, a configuration is included in which discharge to the cooling device while the storage battery is discharging a large amount of current to the external power source is limited by setting a cooling power threshold. Heat generation of the storage battery due to Joule heat can accordingly be reduced, which makes highly efficient cooling of the storage battery possible as well as the prevention of storage battery deterioration due to heavy load. The embodiments of the present invention also include a configuration in which the storage battery is cooled without limiting the current charged from and discharged to the external power source, by controlling the power of the cooling device. The ability to stabilize system power is accordingly high.

It is consequently possible to provide the storage battery cooling control device and the storage battery cooling control method in which the ability to stabilize system power is kept high while preventing high temperature and heavy load from cutting short the life span of the storage battery by efficiently cooling the storage battery with the cooling device.

DESCRIPTION OF EMBODIMENTS

A description is given below with reference to the drawings on storage battery cooling control devices and storage battery cooling control methods according to preferred embodiments of the present invention.

First Embodiment

Figure 1:
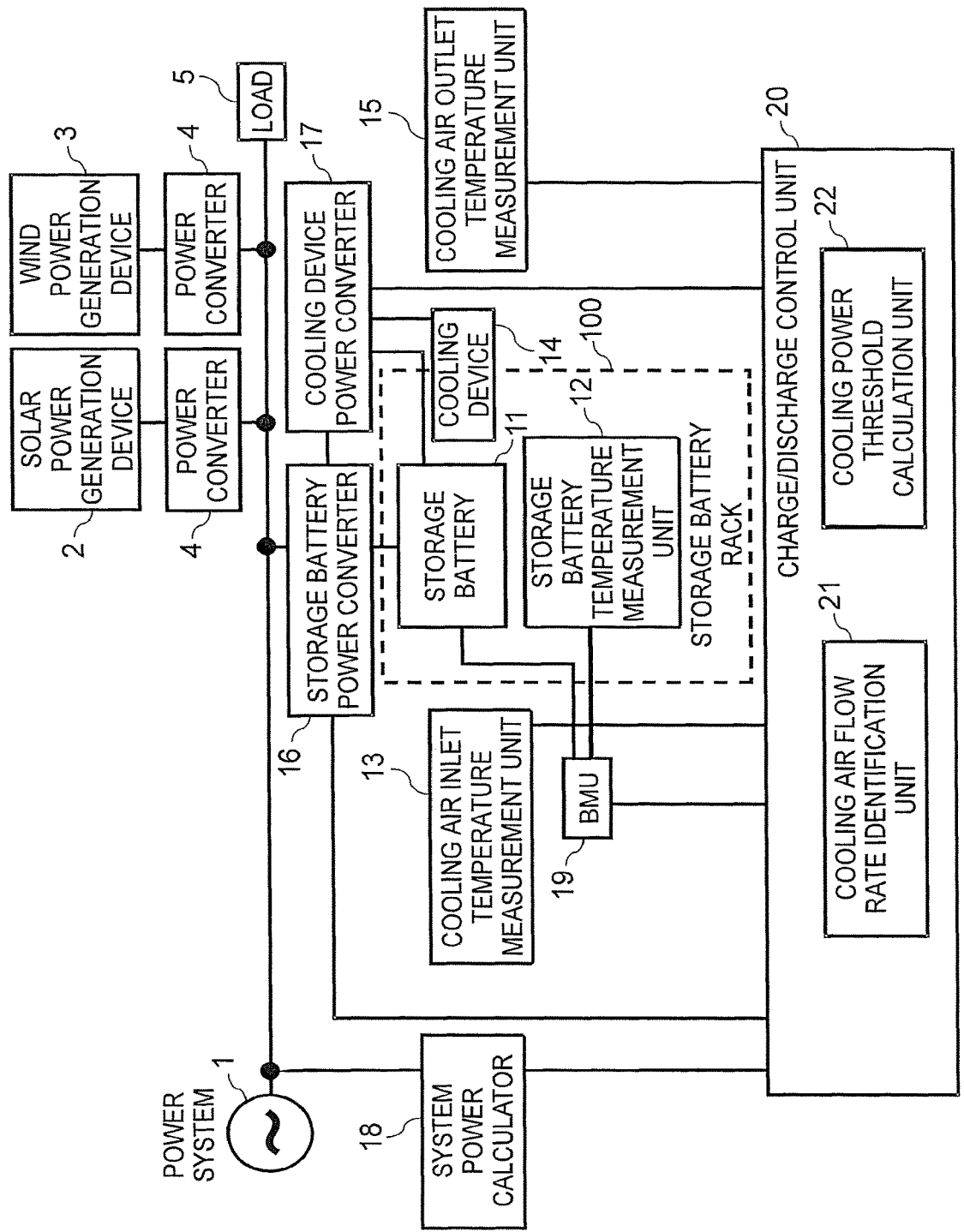
FIG. 1 is a diagram for illustrating the overall configuration of a storage battery system in which a storage battery cooling control device according to a first embodiment of the present invention is included.

FIG. 1 is a diagram for illustrating the overall configuration of a storage battery system in which a storage battery cooling control device according to a first embodiment of the present invention is included. The description of the first embodiment takes as an example a storage battery system installed in a power plant, a substation, or a similar facility to execute charging/discharging for the purpose of suppressing power fluctuation caused in a power system 1 by a solar power generation device 2, a wind power generation device 3, a load 5, or other components.

In FIG. 1, each of the solar power generation device 2 and the wind power generation device 3 is connected to the power system 1 via a power converter 4. The mode illustrated in FIG. 1 is merely an example, and the storage battery system may have modes for other uses.

The storage battery system illustrated in FIG. 1 includes a storage battery 11, a storage battery temperature measurement unit 12, a cooling air inlet temperature measurement unit 13, a cooling device 14, a cooling air outlet temperature measurement unit 15, a storage battery power converter 16, a cooling device power converter 17, a system power calculator 18, a battery management unit (BMU) 19, a charge/discharge control unit 20, a cooling air flow rate identification unit 21, and a cooling power threshold calculation unit 22, and is connected to the power system 1.

The storage battery 11 is, for example, a rechargeable secondary battery constructed from a lead storage battery, a nickel hydride battery, or a lithium ion battery, and is placed in a storage battery rack 100. The storage battery 11 has the configuration of a cell or a module. A plurality of cells or modules may be provided in one rack.

The storage battery rack 100 is shaped like a rectangular solid and has an internal space. The storage battery 11 and the storage battery temperature measurement unit 12 are placed in the space inside the storage battery rack 100. A cooling air inlet is marked out on a surface of the storage battery rack 100, and a cooling air inlet temperature measurement unit 13 is installed near the cooling air inlet. A cooling air outlet is marked out on a surface of the storage battery rack 100 opposed to the cooling air inlet, and the cooling device 14, a cooling air flow rate measurement device (not shown), and the cooling air outlet temperature measurement unit 15 are installed near the cooling air outlet.

The storage battery power converter 16 is interconnected to the power system 1, which is an external power source, and is provided in association with the storage battery 11 to convert input power and output power of the storage battery 11.

The cooling device power converter 17 is interconnected to the storage battery power converter 16 and the storage battery 11, and is provided in association with the cooling device 14 to convert input power of the cooling device 14.

The system power calculator 18 is configured to calculate the system power of the power system 1 from the voltage and current of the power system 1.

The storage battery temperature measurement unit 12, the cooling air inlet temperature measurement unit 13, and the cooling air outlet temperature measurement unit 15 are configured to measure a storage battery temperature T, a cooling air inlet temperature Tin of the storage battery rack 100, and a cooling air outlet temperature Tout of the storage battery rack 100, respectively. The temperature measurement units may have any configuration as long as the temperature can be measured, and are each constructed from a thermometer or a temperature sensor, for example.

A plurality of temperature measurement units of each type may be provided in one rack. In this case, an average of values measured by the plurality of temperature measurement units is used as the storage battery temperature T, the cooling air inlet temperature Tin of the storage battery rack 100, or the cooling air outlet temperature Tout of the storage battery rack 100.

The BMU 19 is a storage battery management device having a protection function and a state monitoring function. Specifically, the protection function of the BMU 19 halts the operation of the storage battery 11 when over-charge, over-discharge, over-voltage, over-current, temperature irregularity, or the like occurs in the storage battery 11. The state monitoring function of the BMU 19 executes storage battery state monitoring such as voltage measurement, current measurement, power amount measurement, and SOC management (SOC stands for state of charge, which means the remaining capacity of the storage battery) of the storage battery 11.

The cooling air flow rate identification unit 21 stores a data map of cooling air flow rates associated in advance from the combined efficiency of the cooling device power converter 17 and a motor of a cooling fan, the characteristics of the cooling fan, and the air passage resistance. The cooling air flow rate identification unit 21 is configured to identify a cooling air flow rate Qair from power distributed to the cooling device 14.

The cooling power threshold calculation unit 22 is configured to calculate a cooling power threshold Plim based on a heat generation amount Hg of the storage battery 11 and on a heat exhaust amount Hd. The heat generation amount Hg is calculated from a current value I of the storage battery 11 and a resistance value R of the storage battery 11. The heat exhaust amount Hd is calculated from an air density ρair, an air specific heat Cair, the cooling air inlet temperature Tin, the cooling air outlet temperature Tout, and the cooling air flow rate Qair.

The charge/discharge control unit 20 obtains power information on the power system 1 from the system power calculator 18. The charge/discharge control unit 20 issues a command to the storage battery power converter 16 to charge a power storage system when the power system 1 has excess power, and to discharge the power storage system when the power system 1 is in shortage of power.

The charge/discharge control unit 20 also issues a command to the storage battery power converter 16 to distribute power from the power system 1 to the cooling device 14, and issues a command to the cooling device power converter 17 to distribute power from the storage battery 11 to the cooling device 14.

The cooling device 14 is configured to cool the storage battery 11 with the use of power distributed from the storage battery power converter 16 and the storage battery 11. The cooling device 14 may be any device capable of cooling the storage battery 11, and is constructed from a cooling fan, for example.

The cooling fan is provided near the cooling air outlet of the storage battery rack 100, in which the storage battery 11 is housed. Cooling air created by the cooling fan is taken in from the cooling air inlet, flows around the storage battery 11 to remove heat, and is then let out from the cooling air outlet.

A series of operation steps related to charge/discharge control in the first embodiment is described below.

Figure 2:
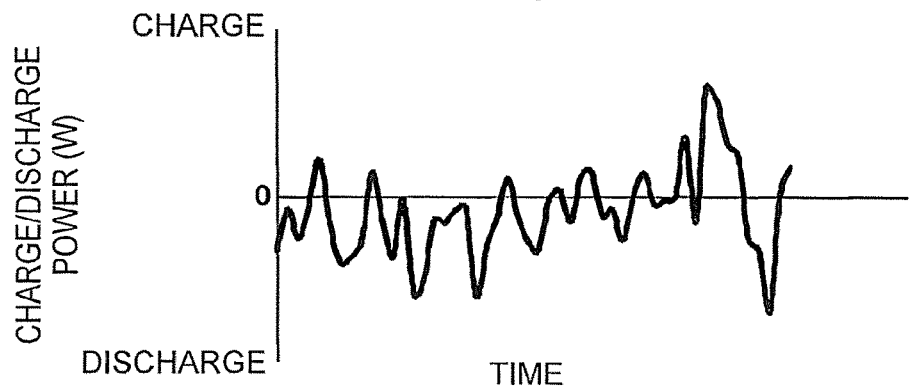
FIG. 2 is a graph for showing charge/discharge patterns of the storage battery cooling control device according to the first embodiment of the present invention, which uses a power storage system.

FIG. 2 is a graph for showing charge/discharge patterns of the storage battery cooling control device according to the first embodiment of the present invention, which uses the power storage system. Each charge/discharge pattern shown in FIG. 2 is characterized by having amplitude fluctuation. When the storage battery 11 is used to suppress the fluctuation in the charge/discharge pattern shown in FIG. 2, for example, heat generated by the storage battery 11 during charge/discharge raises the storage battery temperature T.

When the storage battery is cooled by the cooling device 14 in order to prevent a rise in storage battery temperature, efficient cooling is accomplished by distributing charge power with which the power storage system is charged to the cooling device 14. However, cooling is required during discharge as well when the charge power alone is not enough to cool the storage battery, or when discharge is executed in succession.

When a certain amount of power is kept distributed for cooling during discharge, power additionally distributed to the cooling device 14 in the discharge of a large amount of current to the power system 1 further increases the discharge current. The amount of Joule heat generated by the large amount of current is accordingly very large.

Possible consequences include a drop in cooling efficiency or a rise in the temperature of the storage battery 11, and storage battery deterioration due to heavy load.

For that reason, the storage battery cooling control device according to the first embodiment has a configuration for optimizing storage battery cooling by calculating the cooling power threshold Plim and distributing power from the storage battery 11 to the cooling device 14 within a range in which an increase in the amount of heat generated by the storage battery 11 is equal to or less than an increase in the amount of heat exhausted by the cooling device 14.

The method of calculating the cooling power threshold Plim is described in detail below with the use of mathematical expressions.

First, the method of calculating the storage battery heat generation amount Hg is described. Heat is generated due to Joule heat when a current flows into the storage battery. Joule heat is expressed by Expression (1), and depends on the charge/discharge current value I and the resistance R of the storage battery.

$$Hg = I^2 * R \quad (1)$$

Hg (W): storage battery heat generation amount
I (A): charge/discharge current value
R (Ω): storage battery resistance Joule heat is calculated for each cell, or each module, present in the same storage rack 100, and the sum of the cells' or modules' Joule heat values is used as the storage battery heat generation amount Hg. The storage battery resistance R is not required to be a constant value, and may vary depending on the storage battery temperature T and the SOC, or due to storage battery deterioration. The storage battery resistance R can therefore be calculated by any method, and may be calculated from, for example, a voltage drop or a data map stored in advance in the BMU 19.

The charge/discharge current value I is calculated by Expression (2) as the sum of a power Pco, which is the amount of power charged/discharged between the power system 1 and the storage battery 11, and a power Pcool distributed to the cooling device 14. In the calculation, the side on which the storage battery is charged with Pco is the positive side, and the side on which the storage battery discharges Pco is the negative side.

$$I = (Pco + Pcool)/V \quad (2)$$

Pco (W): power charged/discharged between the power system 1 and the storage battery 11
Pcool (W): power distributed to the cooling device 14
V (V): storage battery voltage From Expressions (1) and (2), the storage battery heat generation amount is calculated by Expression (3).

$$Hg = ((-Pco + Pcool)/V)^2 * R \quad (3)$$

A storage battery heat generation increment Hg' is calculated by Expression (4), in which the storage battery heat generation amount Hg is differentiated by Pcool.

$$Hg' = 2 * R * (-Pco + Pcool)/V^2 \quad (4)$$

Figure 3:
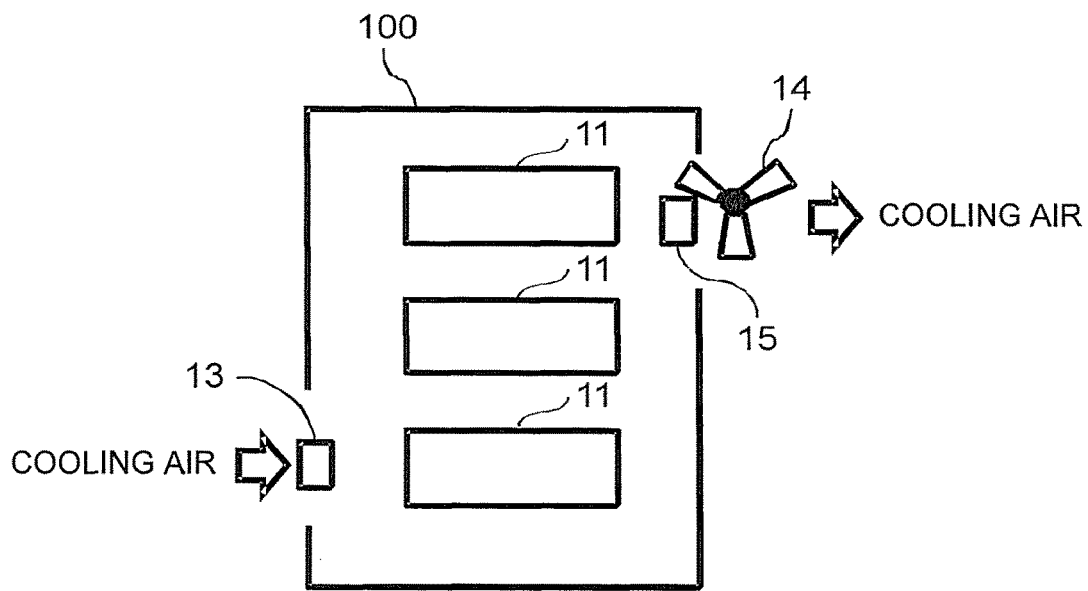
FIG. 3 is a conceptual diagram for schematically illustrating the structure of a storage battery rack in the first embodiment of the present invention.

The method of calculating the cooling air heat exhaust amount Hd is described next. FIG. 3 is a conceptual diagram for schematically illustrating the structure of the storage battery rack 100 in the first embodiment of the present invention. As illustrated in FIG. 3, cooling air created by the cooling device 14 to be introduced into the storage battery rack 100 flows in from the cooling air inlet, flows around the storage battery 11 to remove the heat of the storage battery 11, and is then let out from the cooling air outlet.

The heat exhaust amount Hd in this case is calculated by Expression (5).

$$Hd = \rho air * Cair * (Tout - Tin) * Qair \quad (5)$$

Hd (W): cooling air heat exhaust amount
ρair (kg/m³): air density
Cair (J/kg*K)): air specific heat
Tout (K): cooling air outlet temperature
Tin (K): cooling air inlet temperature
Qair (m³/s): cooling air flow rate The air density ρair and the air specific heat Cair are not required to be constant values, and can be obtained by any method, for example, calculation from a data map stored in advance in which a value of the air density or the air specific heat is associated with a temperature.

Figure 4:
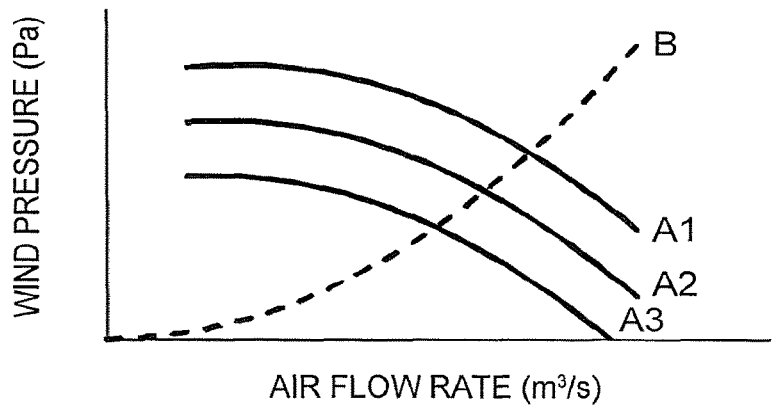
FIG. 4 is a graph for showing an example of a P-Q curve of a cooling fan and air passage resistance in the first embodiment of the present invention.

FIG. 4 is a graph for showing an example of a P-Q curve of the cooling device 14 and air passage resistance in the first embodiment of the present invention. The P-Q curve is equivalent to a curve drawn by taking the air flow rate on the axis of abscissa and taking the wind pressure on the axis of ordinate.

A curve B represents air passage resistance, which is determined by the arrangement of the storage battery rack 100 and the storage battery 11. Curves A1, A2, and A3 represent the cooling fan's P-Q curves different from one another in the number of revolutions of the cooling fan, and the P-Q curves are determined by the model of the cooling fan. The numbers of revolutions in the curves A1, A2, and A3 satisfy A1>A2>A3. Intersecting points between the curve B and the curves A1, A2, and A3 each indicate a wind pressure and an air flow rate at which the storage battery 11 is operated.

Figure 5:
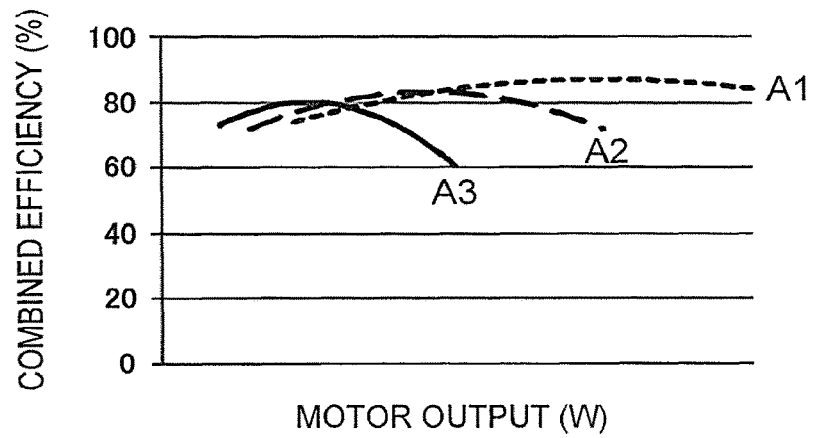
FIG. 5 is a graph for showing an example of the combined efficiency of a cooling device power converter and a motor in the first embodiment of the present invention.

FIG. 5 is a graph for showing an example of the combined efficiency of the cooling device power converter 17 and the motor in the first embodiment of the present invention. From the efficiency of the cooling device power converter 17 and the motor shown in FIG. 5, the characteristics of the cooling fan, and the air passage resistance, the cooling air flow rate can be identified by Expression (6) for each amount of power distributed to the cooling device 14, and the identified value is stored in the cooling air flow rate identification unit 21 in advance.

$$Qair = An * Pcool \quad (6)$$

Qair (m³/s): cooling air flow rate
An (m³/(s*W)): coefficient used to calculate the air flow rate for each amount of power
Pcool (W): power distributed to the cooling device 14

From Expressions (5) and (6), the cooling air heat exhaust amount Hd is calculated by Expression (7).

$$Hd' = \rho air * Cair * (Tout - Tin) * An * Pcool \quad (7)$$

A cooling air heat exhaust increment Hd' is calculated by Expression (8), in which the cooling air heat exhaust amount Hd is differentiated by Pcool.

$$Hd'=\rho air^* Cair^*(Tout-Tin)^*(An'^* Pcool+An) \quad (8)$$

An' (m³/(s*W²)): differentiation by Pcool of the coefficient used to calculate the air flow rate for each amount of power.

Figure 6:
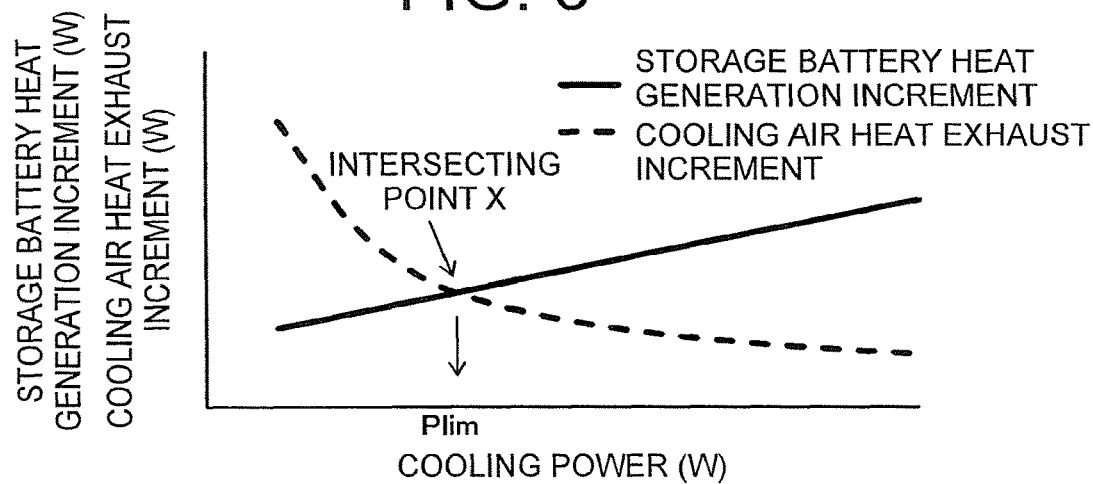
FIG. 6 is a graph for showing, for each amount of power distributed to a cooling device, the relation between a storage battery heat generation increment Hg' and a cooling air heat exhaust increment Hd' in the first embodiment of the present invention.

FIG. 6 is a graph for showing, for each amount of power distributed to the cooling device 14, the relation between the storage battery heat generation increment Hg' and the cooling air heat exhaust increment Hd' in the first embodiment of the present invention. The cooling air heat exhaust increment Hd' is large in a period in which the distributed power is small. However, the storage battery heat generation increment Hg' gradually increases, and the magnitude relation between the cooling air heat exhaust increment Hd' and the storage battery heat generation increment Hg' is reversed at an intersecting point X.

The intersecting point X is a point at which Hg' equals Hd'. Accordingly, Pcool at the intersecting point X is expressed by Expression (9).

$$Pcool(X)=((2^*R^* Pco/V^2)+\rho air^* Cair^*(Tout-Tin)^* An)/((2^*R/V^2)-\rho air^* Cair^*(Tout-Tin)^* An') \quad (9)$$

When power distributed to the cooling device 14 is increased to Pcool (X) or more, the storage battery heat generation increment Hg' undesirably exceeds the cooling air heat exhaust increment Hd', with the result that the efficiency of cooling the storage battery 11 drops.

The value of Pcool(x) at the intersecting point X is accordingly set as the threshold Plim for the power distributed to the cooling device 14, and a command to distribute power equal to or smaller than Plim to the cooling device 14 is issued from the charge/discharge control unit 20 to the cooling device power converter 17.

Figure 7:
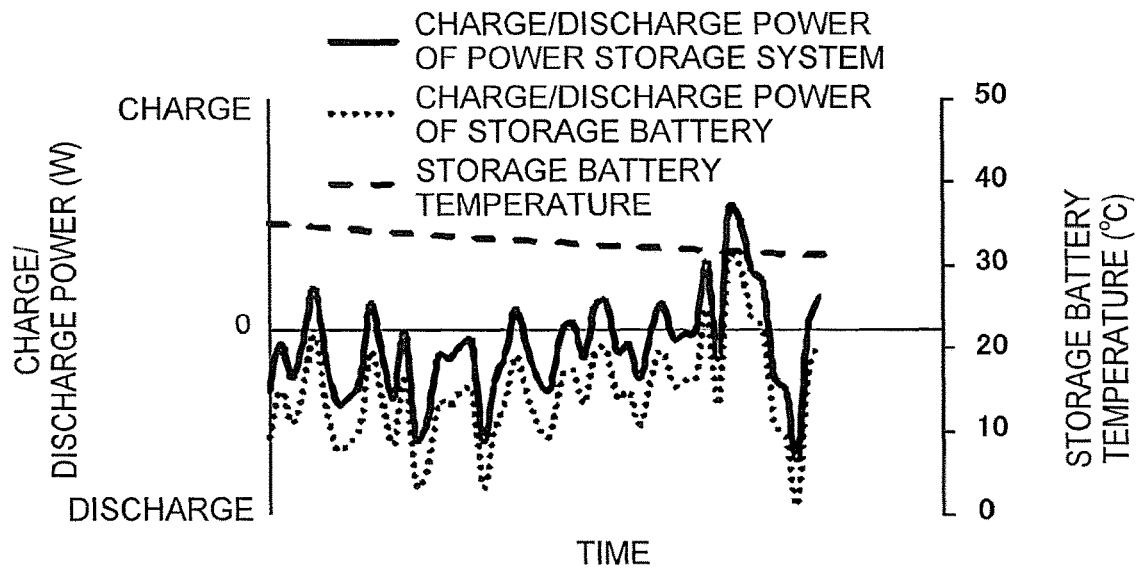
FIG. 7 is a graph for showing the charge/discharge power of a power storage system, the charge/discharge power of the storage battery 11, and the temperature of the storage battery 11 in the related art.

FIG. 7 is a graph for showing the charge/discharge power of a power storage system, the charge/discharge power of the storage battery 11, and the temperature of the storage battery 11 in the related art. Specifically, the charge/discharge power of the power storage system, the charge/discharge power of the storage battery 11, and the temperature of the storage battery 11 that are shown in the graph are those observed in the related art when a certain amount of power is distributed from the storage battery 11 to the cooling device 14 while the power storage system is discharging.

When a certain amount of power is distributed to the cooling device 14, discharge from the storage battery 11 to the cooling device 14 occurs while the storage battery is discharging a large amount of current to the external power source as shown in FIG. 7. The storage battery heat generation amount Hg due to Joule heat consequently increases further, thereby causing a drop in the efficiency of cooling by the cooling fan.

Figure 8:
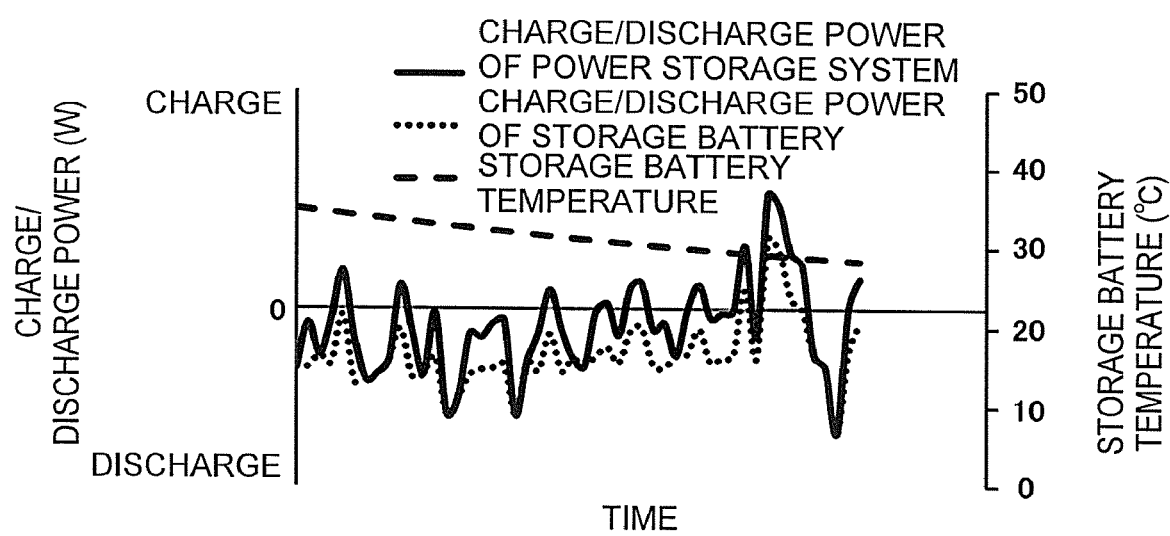
FIG. 8 is a graph for showing the charge/discharge power of the power storage system, the charge/discharge power of the storage battery 11, and the temperature of the storage battery 11 in the first embodiment of the present invention.

FIG. 8, on the other hand, is a graph for showing the charge/discharge power of the power storage system, the charge/discharge power of the storage battery 11, and the temperature of the storage battery 11 in the first embodiment of the present invention. Specifically, the charge/discharge power of the power storage system, the charge/discharge power of the storage battery 11, and the temperature of the storage battery 11 that are shown in the graph are those observed in the first embodiment when a certain amount of power is distributed from the storage battery 11 to the cooling device 14 while the power storage system is discharging and, in the case where the certain amount of power is equal to or greater than the cooling power threshold Plim, the power distributed to the cooling device 14 is set to the cooling power threshold Plim.

When the power distributed to the cooling device 14 is within the cooling power threshold Plim, no power is distributed to the cooling device 14 during the discharge of a large amount of current as shown in FIG. 8. As a result, the storage battery heat generation amount Hg is reduced and efficient cooling is accomplished.

Figure 9:
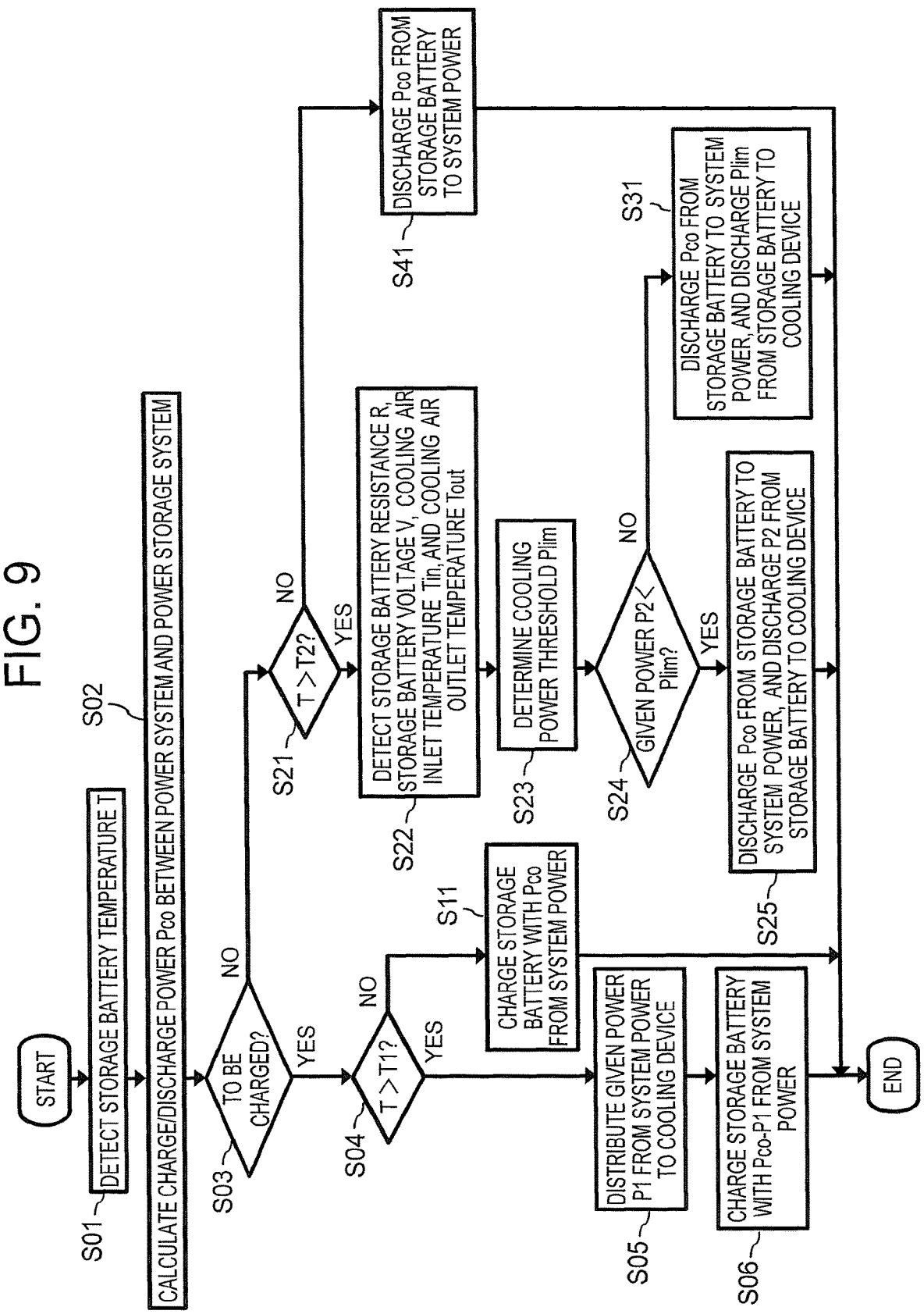
FIG. 9 is a flow chart for illustrating a series of processing steps that is executed by the storage battery cooling control device according to the first embodiment of the present invention.

A more detailed description is given below with reference to a flow chart on the series of operation steps of the storage battery cooling control device according to the first embodiment. FIG. 9 is a flow chart for illustrating a series of processing steps that is executed by the storage battery cooling control device according to the first embodiment of the present invention. The processing illustrated in FIG. 9 is executed repeatedly at regular time intervals while the power storage system is running.

First, the charge/discharge control unit 20 obtains the result of measurement conducted by the storage battery temperature measurement unit 12 to measure the storage battery temperature T (Step S01). The charge/discharge control unit 20 next calculates the system power of the power system 1 from the voltage and current of the power system 1 obtained from the system power calculator 18, and further calculates the charge/discharge power Pco between the power system 1 and the power storage system (Step S02).

The charge/discharge control unit 20 next determines whether the power storage system is to be charged or discharged (Step S03). When determining that the power storage system is to be charged, the charge/discharge control unit 20 compares the storage battery temperature T and a set charge temperature T1 (Step S04). When the result of the comparison is T≤T1, the charge/discharge control unit 20 performs control so that the storage battery 11 is charged with the charge/discharge power Pco from the system power (Step S11).

When the comparison result is T>T1 in Step S04, on the other hand, a given power P1 set in advance is distributed from the system power to the cooling device 14 (Step S05), and the storage battery 11 is charged with Pco-P1 from the system power (Step S06). The given power P1 is set in advance as any constant power value based on the efficiency of the cooling device 14 or other factors.

When it is determined in Step S03 that the power storage system is to be discharged, the charge/discharge control unit 20 compares the storage battery temperature T and a set discharge temperature T2 (Step S21). When the result of the comparison is T≤T2, the charge/discharge control unit 20 performs control so that the charge/discharge power Pco is discharged from the storage battery 11 to the system power (Step S41).

When the result of the comparison is T>T2 in Step S21, on the other hand, the charge/discharge control unit 20 collects the results of measuring the storage battery resistance R, the storage battery voltage V, the cooling air inlet temperature Tin, and the cooling air outlet temperature Tout (Step S22).

The charge/discharge control unit 20 then calculates the cooling power threshold Plim (Step S23). The charge/discharge control unit 20 compares the calculated Plim and a given power P2 set in advance (Step S24). When the result of the comparison is P2<Plim, the charge/discharge control unit 20 performs control so that the charge/discharge power Pco is discharged from the storage battery 11 to the system power, and so that the given power P2 is discharged from the storage battery 11 to the cooling device 14 (Step S25).

When the result of the comparison is P2≥Plim in Step S24, on the other hand, the charge/discharge control unit 20 performs control so that the charge/discharge power Pco is discharged from the storage battery 11 to the system power, and so that the cooling power threshold Plim is discharged from the storage battery 11 to the cooling device 24 (Step S31). The given power P2 is set in advance as any constant power value based on the efficiency of the cooling device 14 or other factors.

The set discharge temperature T2 is designed to be higher than the set charge temperature T1, and the charge/discharge control unit 20 performs control so that the storage battery 11 is cooled during discharge as well when cooling during charge is not enough, or when the storage battery temperature rises due to successive discharge cycles.

As described above, according to the first embodiment, a configuration is included in which discharge to the cooling device is limited while the storage battery is discharging a large amount of current to the external power source by setting a cooling power threshold. The first embodiment also includes a configuration in which the storage battery is cooled without limiting the charge/discharge current to/from the external power source, by controlling the power of the cooling device.

A storage battery cooling control device and a storage battery cooling control method in which the ability to stabilize system power is kept high while preventing high temperature and heavy load from cutting short the life span of the storage battery by efficiently cooling the storage battery with a cooling fan can be implemented as a result.

Second Embodiment

A second embodiment of the present invention deals with a case in which charge is controlled with a charge current threshold taken into consideration. The second embodiment also deals with a case in which discharge is controlled with the cooling power threshold taken into consideration by a method different from the one in the first embodiment.

The method of determining a charge current threshold in the second embodiment is described first. The EMU 19 first determines an SOC range of the storage battery 11. The SOC is a charging rate indicating the remaining capacity of the storage battery 11, and is expressed by a numerical value within a range of from 0% to 100%. An SOC of 0% means a completely discharged state, and an SOC of 100% means a fully charged state.

The SOC is estimated by a commonly known current integration method, an OCV estimation method (OCV stands for open circuit voltage, which is the battery voltage), or a similar method. However, the method of estimating the SOC is not limited thereto, and any method can be used.

The range of from 0% to 100% is divided into a plurality of ranges as SOC ranges. In this case, each SOC range is 10% for the purpose of description, but is not limited to 10% and can freely be determined.

The BMU 19 next determines a temperature range of the storage battery 11. The storage battery temperature is measured by the storage battery temperature measurement unit 12, and to which temperature range the measured temperature belongs is determined. In this case, each temperature range is 5° C. for the purpose of description, but is not limited to 5° C. and can freely be determined.

Next, the charge/discharge control unit 20 calculates the charge current threshold from the SOC range and the storage battery temperature range. The charge/discharge control unit 20 includes a table in which a charge current threshold is defined in advance in association with a combination of an SOC range and a storage battery temperature range, and determines the charge current threshold from SOC information provided by the BMU 19 and from temperature information provided by the storage battery temperature measurement unit 12.

An example of the table in which a charge current threshold is associated with a combination of an SOC range and a storage battery temperature range in the second embodiment of the present invention is shown in Table 1.

TABLE 1

Table 1

| Current rate (C) | | SOC (%) | | | | | |
|---|---|---|---|---|---|---|---|
| | | ~50 | 50~60 | 60~70 | 70~80 | 80~90 | 90~100 |
| Temperature (° C.) | ~25 | 3 | 3 | 1.5 | 0.8 | 0.5 | 0 |
| | 25~30 | 1 | 1 | 0.7 | 0.6 | 0.2 | 0 |
| | 30~35 | 0.8 | 0.7 | 0.6 | 0.5 | 0.1 | 0 |
| | 25~40 | 0.4 | 0.35 | 0.3 | 0.25 | 0.05 | 0 |
| | 40~ | 0 | 0 | 0 | 0 | 0 | 0 |

When the storage battery temperature is 32° C. and the storage battery SOC is 75%, for example, the charge/discharge control unit 20 extracts a current rate of 0.5 as the charge current threshold from the table. The charge current threshold is set so as to decrease as the value of the SOC increases, and so as to decrease as the value of the storage battery temperature increases. The changes of the charge current threshold may be monotonous, or may fluctuate in variation width.

Figure 10:
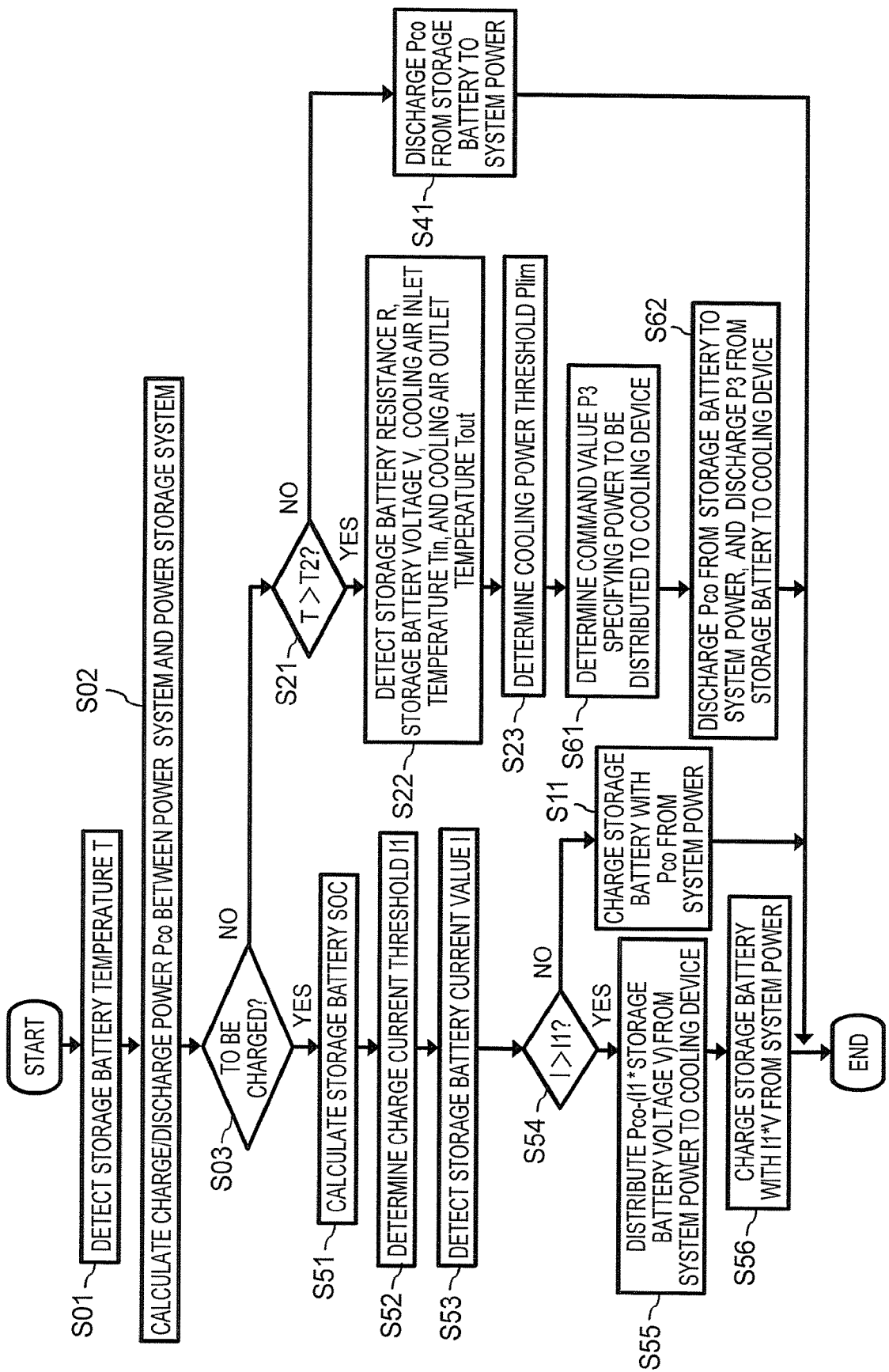
FIG. 10 is a flow chart for illustrating a series of processing steps that is executed by a storage battery cooling control device according to a second embodiment of the present invention.

A more detailed description is given below with reference to a flow chart on the series of operation steps of the storage battery cooling control device according to the second embodiment. FIG. 10 is a flow chart for illustrating a series of processing steps that is executed by the storage battery cooling control device according to the second embodiment of the present invention. The processing illustrated in FIG. 10 is executed repeatedly at regular time intervals while the power storage system is running. The same processing steps as the ones in FIG. 9 are denoted by the same step numbers.

First, the charge/discharge control unit 20 obtains the result of measurement conducted by the storage battery temperature measurement unit 12 to measure the storage battery temperature T (Step S01). The charge/discharge control unit 20 next calculates the system power of the power system 1 from the voltage and current of the power system 1 obtained from the system power calculator 18, and further calculates the charge/discharge power Pco between the power system 1 and the power storage system (Step S02).

The charge/discharge control unit 20 next determines whether the power storage system is to be charged or discharged (Step S03). When determining that the power storage system is to be charged, the charge/discharge control unit 20 calculates the storage battery SOC (Step S51). The charge/discharge control unit 20 then calculates a charge current threshold I1 from the storage battery temperature T and the storage battery SOC (Step S52).

The charge/discharge control unit 20 next detects the result of measuring the storage battery current value I (Step S53), and compares the storage battery current value I and the charge current threshold I1 (Step S54). When determining that I≤I1 is established, the charge/discharge control unit 20 performs control so that the storage battery 11 is charged with the charge/discharge power Pco from the system power (Step S11).

When determining that I>I1 is established, on the other hand, the charge/discharge control unit 20 performs control so that Pco−(I1*V) is distributed to the cooling device 14 from the system power (Step S55), and so that the storage battery 11 is charged with I1*V from the system power (Step S56).

When it is determined in Step S03 that the power storage system is to be discharged, the charge/discharge control unit 20 compares the storage battery temperature T and a set discharge temperature T2 (Step S21). When the result of the comparison is T≤T2, the charge/discharge control unit 20 perform is control so that the charge/discharge power Pco is discharged from the storage battery 11 to the system power (Step S41).

When the result of the comparison is T>T2 in Step S21, on the other hand, the charge/discharge control unit 20 collects the results of measuring the storage battery resistance R, the storage battery voltage \T, the cooling air inlet temperature Tin, and the cooling air outlet temperature Tout (Step S22).

The charge/discharge control unit 20 then calculates the cooling power threshold Plim (Step S23). The charge/discharge control unit 20 next multiplies Plim by a given coefficient set in advance, for example, 0.5, to create a command value P3, which specifies power to be distributed to the cooling device 14 (Step S61). The charge/discharge control unit 20 performs control so that the charge/discharge power Pco is discharged from the storage battery 11 to the system power, and so that the command value P3 is discharged from the storage battery 11 to the cooling device 14 (Step S62).

The given coefficient by which the threshold for power to be distributed to the cooling device 14 is multiplied is not limited to 0.5, and can be any value between 0 and 1.

Figure 11:
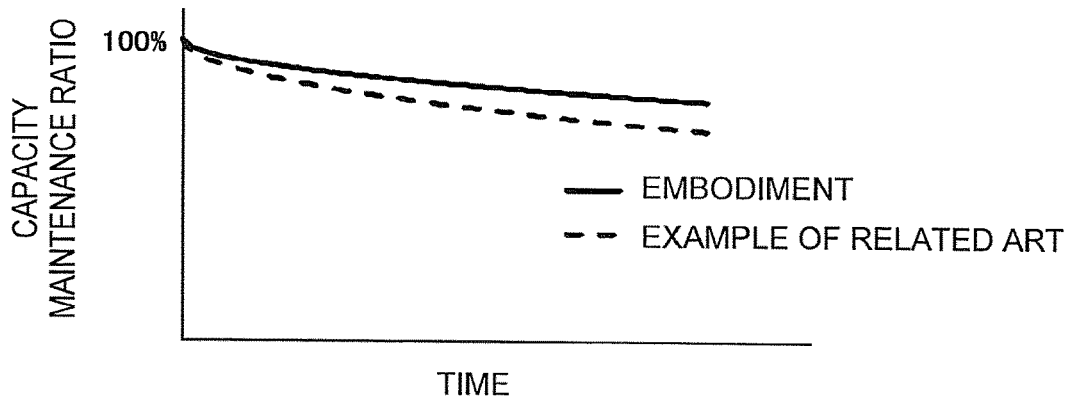
FIG. 11 is a graph for showing changes with time of a capacity maintenance ratio that are observed when the storage battery 11 is operated by a charge/discharge control method of the second embodiment of the present invention and a charge/discharge control method of the related art.

FIG. 11 is a graph for showing changes with time of the capacity maintenance ratio that are observed when the storage battery 11 is operated by the charge/discharge control method of the second embodiment of the present invention and a charge/discharge control method of the related art. In the related art, a drop in cooling efficiency during discharge accelerates the deterioration of the storage battery 11 and the capacity maintenance ratio lowers significantly with time. In addition, deterioration from heavy load is observed as well due to the large discharge current value.

Compared to the related art, the storage battery temperature can be controlled efficiently when the storage battery 11 is operated by the charge/discharge control method described in the second embodiment. In addition, the current value can be prevented from increasing during discharge, and the lowering of the capacity maintenance ratio with time is consequently prevented, which means that the life span of the storage battery 11 can be expected to be prolonged.

According to the second embodiment, the same effects as the ones in the first embodiment are obtained by setting the cooling power threshold as described above. The second embodiment also includes a configuration in which charge control using a charge current threshold and discharge control using a command value that is obtained by multiplying the cooling power threshold by a given coefficient can be executed. Charge/discharge control more finely adapted to the state of the device than in the first embodiment is accomplished as a result.

Figure 12:
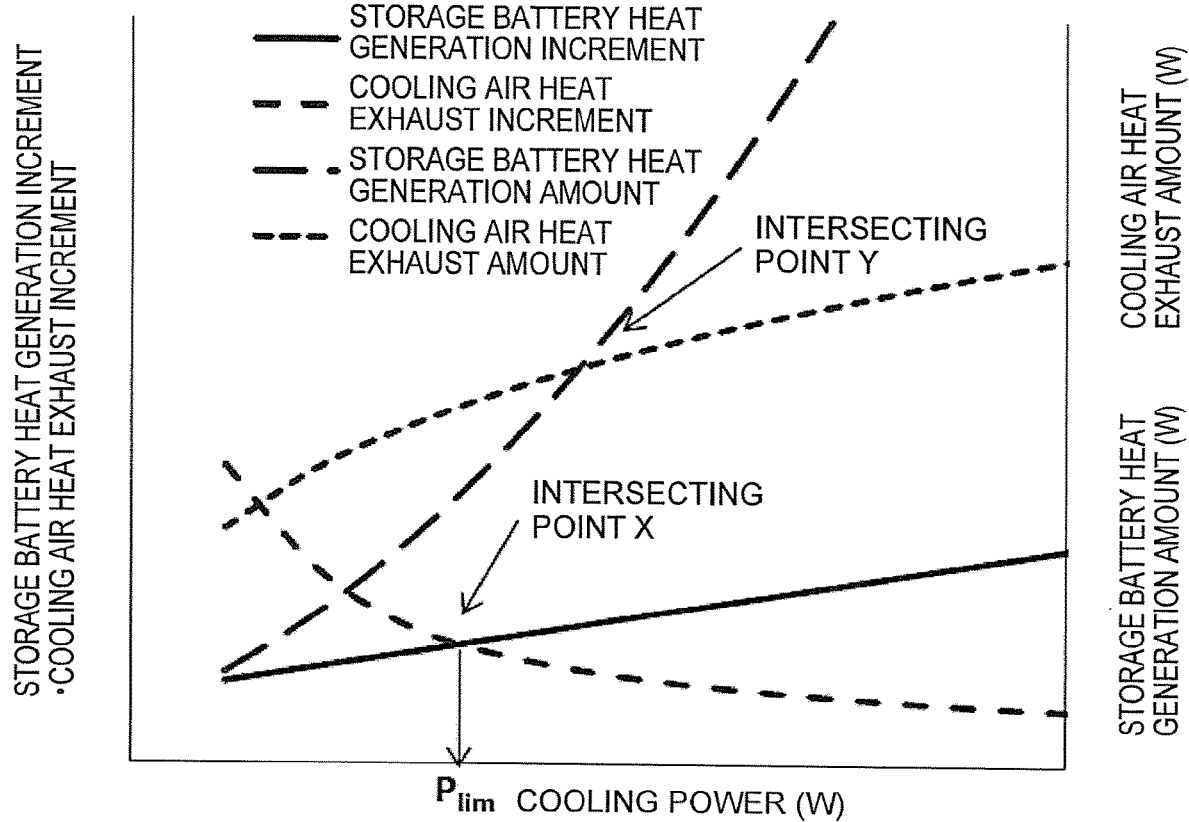
FIG. 12 is a graph for showing, for each amount of cooling power, heat exhaust amounts, heat generation amounts, heat exhaust increments, and heat generation increments observed when the storage battery 11 is operated by the charge/discharge control method of the second embodiment of the present invention and the charge/discharge control method of the related art.

FIG. 12 is a graph for showing, for each amount of cooling power, heat exhaust amounts, heat generation amounts, heat exhaust increments, and heat generation increments observed when the storage battery 11 is operated by the charge/discharge control method of the second embodiment of the present invention and the charge/discharge control method of the related art. An intersecting point at which the heat generation amount and the heat exhaust amount are equal to each other is shown as an intersecting point Y. An intersecting point at which the heat generation increment and the heat exhaust increment are equal to each other is shown as an intersecting point X. In the related art, cooling power is kept equal to or lower than the intersecting point Y, at which the heat generation amount and the heat exhaust amount are equal to each other. However, by allotting power to the cooling device, a range equal to or higher than the intersecting point X and lower than the intersecting point Y, in which the heat generation increment exceeds the heat exhaust increment, is created inside the range in which the heat generation amount does not exceed the heat exhaust amount, resulting in a drop in cooling efficiency.

When the storage battery 11 is operated by the charge/discharge control method described in the second embodiment, on the other hand, the cooling power at the intersecting point X is set as the cooling power threshold Plim, and control is performed to keep the cooling power equal to or less than Plim. The storage battery temperature can thus be controlled efficiently compared to the related art.

REFERENCE SIGNS LIST

1 power system, 2 solar power generation device, 3 wind power generation device, 4 power converter, 5 load, 11 storage battery, 12 storage battery temperature measurement unit, 13 cooling air inlet temperature measurement unit, 14 cooling device, 15 cooling air outlet temperature measurement unit, 16 storage battery power converter, 17 cooling device power converter, 18 system power calculator, 19 BMU, 20 charge/discharge control unit, 21 cooling air flow rate identification unit, 22 cooling power threshold calculation unit, 100 storage battery rack

The invention claimed is:

1. A storage battery cooling control device to be applied to a storage battery system, which includes a storage battery interconnected to an external power source to charge/discharge and a cooling device configured to cool the storage battery, and is configured to execute cooling control of the storage battery by controlling the cooling device in a manner suited to a charge/discharge state, the storage battery cooling control device comprising:

a system power calculator configured to calculate, as power information, power of the external power source from a voltage and current of the external power source;

a cooling air flow rate identification unit configured to identify a cooling air flow rate from power input to the cooling device;
a cooling air inlet temperature measurement unit configured to detect a temperature at a cooling air inlet of a housing in which the storage battery is placed;
a cooling air outlet temperature measurement unit configured to detect a temperature at a cooling air outlet of the housing; and
a charge/discharge control unit configured to perform charge/discharge control of the storage battery based on the power information, which is calculated by the system power calculator, and to perform power control of the cooling device by distributing power to the cooling device within a cooling power threshold, which is determined from a heat generation amount of the storage battery and from a heat exhaust amount of heat exhausted by the cooling device,
wherein the charge/discharge control unit is configured to:
calculate the heat generation amount of the storage battery from the power input to the cooling device and from the power of the external power source calculated by the system power calculator, calculate the heat exhaust amount of heat exhausted by the cooling device from the cooling air flow rate identified by the cooling air flow rate identification unit, from the temperature detected at the cooling air inlet by the cooling air inlet temperature measurement unit, and from the temperature detected at the cooling air outlet by the cooling air outlet temperature measurement unit, and determine the cooling power threshold so that a heat generation increment is equal to or less than a heat exhaust increment; and
perform the charge/discharge control based on the power information by charging excess power of the external power source and discharging an amount of power that is in shortage in the external power source, and perform the power control by distributing power to the cooling device within a range equal to or less than the cooling power threshold.

2. A storage battery cooling control device according to claim 1, further comprising a storage battery temperature measurement unit configured to detect a storage battery temperature,
wherein the charge/discharge control unit is configured to perform the power control by distributing power to the cooling device when the storage battery temperature is higher than a temperature threshold, which is set in advance, and by distributing no power to the cooling device when the storage battery temperature is equal to or lower than the temperature threshold.

3. A storage battery cooling control device according to claim 2, further comprising:
a battery management unit having a protection function to protect the storage battery and a state monitoring function to monitor a state of the storage battery, configured to measure a current value of the storage battery, and configured to estimate a charging rate, which indicates a remaining capacity of the storage battery; and
a storage unit configured to store, in advance, a table for determining a charge current threshold in association with a combination of the charging rate and the storage battery temperature,
wherein the charge/discharge control unit is configured to extract, from the table, the charge current threshold that is associated with the storage battery temperature detected by the storage battery temperature measurement unit and with the charging rate estimated by the battery management unit, and perform the power control by distributing power to the cooling device when the current value of the storage battery measured by the Battery Management Unit is higher than the charge current threshold extracted from the table, and by distributing no power to the cooling device when the current value of the storage battery is equal to or lower than the charge current threshold.

4. A storage battery cooling control method to be executed in the storage battery cooling control device of claim 1 by the charge/discharge control unit, the storage battery cooling control method comprising;
a first step of calculating the heat generation amount of the storage battery from the power input to the cooling device and from the power of the external power source calculated by the system power calculator;
a second step of calculating the heat exhaust amount of heat exhausted by the cooling device from the cooling air flow rate identified by the cooling air flow rate identification unit, from the temperature detected at the cooling air inlet by the cooling air inlet temperature measurement unit, and from the temperature detected at the cooling air outlet by the cooling air outlet temperature measurement unit;
a third step of determining the cooling power threshold so that a heat generation increment is equal to or less than a heat exhaust increment;
a fourth step of performing the charge/discharge control based on the power information, by charging excess power of the external power source and discharging an amount of power that is in shortage in the external power source; and
a fifth step of performing the power control by distributing power to the cooling device within a range equal to or less than the cooling power threshold.

5. A storage battery cooling control method according to claim 4, further comprising a sixth step of detecting a storage battery temperature via a storage battery temperature measurement unit,
wherein the fifth step includes performing the power control by distributing power to the cooling device when the storage battery temperature is higher than a temperature threshold, which is set in advance, and by distributing no power to the cooling device when the storage battery temperature is equal to or lower than the temperature threshold.

6. A storage battery cooling control method according to claim 5, further comprising:
a seventh step of obtaining, via a Battery Management Unit, which has a protection function to protect the storage battery and a state monitoring function to monitor a state of the storage battery, a current value of the storage battery and a charging rate, which indicates a remaining capacity of the storage battery; and
an eighth step of storing, in a storage unit, in advance, a table for determining a charge current threshold in association with a combination of the charging rate and the storage battery temperature,
wherein the fifth step includes extracting, from the table stored in the storage unit, the charge current threshold that is associated with the storage battery temperature detected in the sixth step and with the charging rate obtained in the seventh step, and performing the power control by distributing power to the cooling device when the current value of the storage battery obtained in the seventh step is higher than the charge current threshold extracted from the table, and by distributing no power to the cooling device when the current value of the storage battery is equal to or lower than the charge current threshold.

\* \* \* \* \*